United States Patent
Kwon et al.

(10) Patent No.: US 9,496,935 B1
(45) Date of Patent: Nov. 15, 2016

(54) APPARATUS AND METHOD OF BLIND DETECTION OF PRECODING MATRIX INDEX OF INTERFERENCE IN WIRELESS COMMUNICATION SYSTEM

(71) Applicant: Samsung Electronics Co., Ltd., Gyeonggi-do (KR)

(72) Inventors: Hyukjoon Kwon, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/957,324

(22) Filed: Dec. 2, 2015

Related U.S. Application Data

(60) Provisional application No. 62/220,486, filed on Sep. 18, 2015, provisional application No. 62/220,469, filed on Sep. 18, 2015.

(51) Int. Cl.
*H04B 7/02* (2006.01)
*H04B 7/04* (2006.01)
*H04L 5/00* (2006.01)

(52) U.S. Cl.
CPC ........... *H04B 7/0486* (2013.01); *H04L 5/0048* (2013.01)

(58) Field of Classification Search
CPC ........... H04W 28/048; H04W 52/244; H04W 72/0453; H04W 72/04; H04B 7/024; H04B 7/063; H04B 7/0413; H04B 1/71055; H04B 1/0475; H04B 1/715; H04B 2001/7152; H04B 7/15585; H04B 2001/7154; H04B 1/1027; H04B 7/0452; H04B 1/10; H04B 7/068; H04B 7/0854; H04B 7/0486; H04L 25/0248; H04L 27/2647; H04L 5/0023; H04L 5/0035; H04L 5/023; H04L 1/0606; H04L 25/0328; H04L 1/0036; H04L 25/0242; H04L 27/2691; H04L 47/78; H04J 11/0036
USPC ...... 375/346, 267, 349, 347, 350; 455/114.2
See application file for complete search history.

(56) References Cited

U.S. PATENT DOCUMENTS 7,212,073 B2   5/2007   Youssoufian et al.
7,474,167 B1   1/2009   Zhuang et al.
(Continued)

FOREIGN PATENT DOCUMENTS

WO   WO 2014-006439   1/2014

OTHER PUBLICATIONS

Luis Felipe Del Carpio Vega, System level modeling and evaluation of advanced linear interference aware receivers, School of Electrical Engineering Thesis submitted for examination for the degree of Master of Science in Technology. Espoo Aug. 13, 2012, Aalto University School of Electrical Engineering.

*Primary Examiner* — Rahel Guarino
(74) *Attorney, Agent, or Firm* — The Farrell Law Firm, P.C.

(57) ABSTRACT

An apparatus and method are provided. The apparatus includes a receiver configured to receive a signal; a serving signal cancellation function block connected to the receiver and configured to remove a serving signal from the received signal to provide a residual signal; a blind detection of interference rank function block connected to the serving signal cancellation function block and configured to determine a rank of the residual signal, wherein the rank is one of a first rank and a second rank; and a precoding matrix index determination function block connected to the blind detection of interference rank function block and configured to determine a precoding matrix index based on the rank.

20 Claims, 11 Drawing Sheets

(56) References Cited

U.S. PATENT DOCUMENTS

| | | |
|---|---|---|
| 8,198,944 B2 | 6/2012 | Sun et al. |
| 8,222,962 B2 | 7/2012 | Lin et al. |
| 8,964,911 B1 | 2/2015 | Sun et al. |
| 2009/0041140 A1 | 2/2009 | Xiao et al. |
| 2009/0302958 A1 | 12/2009 | Sakurai et al. |
| 2010/0052795 A1 | 3/2010 | Nakamura et al. |
| 2010/0215075 A1 | 8/2010 | Jonsson et al. |
| 2013/0114437 A1 | 5/2013 | Yoo et al. |
| 2014/0167871 A1 | 6/2014 | Ahmed et al. |
| 2014/0184363 A1 | 7/2014 | Jou et al. |
| 2015/0030092 A1 | 1/2015 | Krishnamurthy |
| 2016/0036547 A1* | 2/2016 | Lee ............... H04B 7/0486 370/329 |

\* cited by examiner

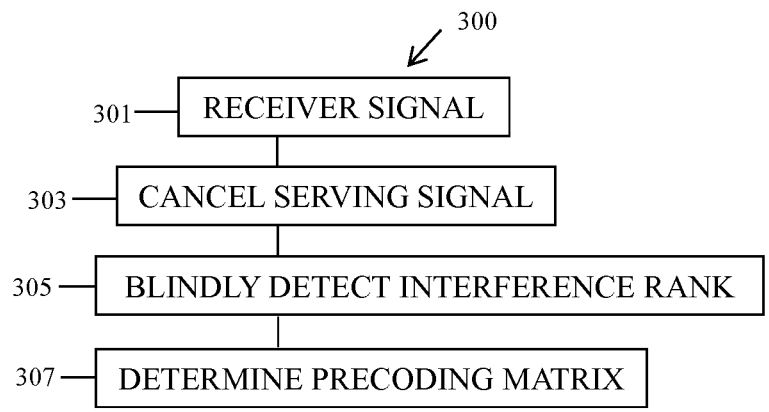
FIG. 3
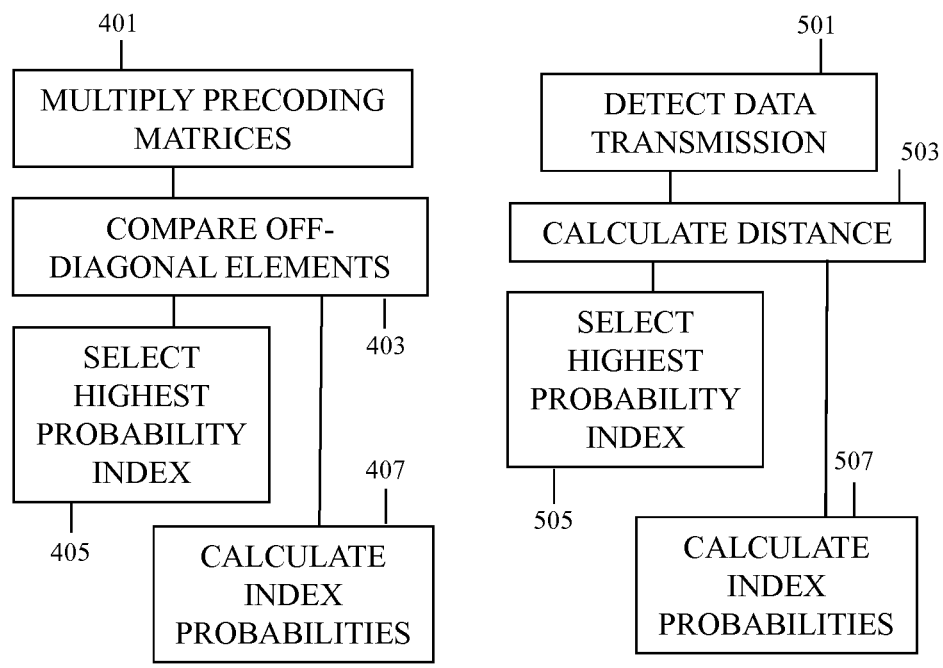
FIG. 4
FIG. 5

$$W_k W_k^\dagger = \begin{cases} \dfrac{1}{2}\begin{bmatrix} 1 & 1 \\ 1 & 1 \end{bmatrix} PMI1 \\ \dfrac{1}{2}\begin{bmatrix} 1 & -1 \\ -1 & 1 \end{bmatrix} PMI2 \\ \dfrac{1}{2}\begin{bmatrix} 1 & -j \\ j & 1 \end{bmatrix} PMI3 \\ \dfrac{1}{2}\begin{bmatrix} 1 & j \\ -j & 1 \end{bmatrix} PMI4 \end{cases}$$

FIG. 8

APPARATUS AND METHOD OF BLIND DETECTION OF PRECODING MATRIX INDEX OF INTERFERENCE IN WIRELESS COMMUNICATION SYSTEM

PRIORITY

This application claims priority under 35 U.S.C. §119(e) to a U.S. Provisional Patent Application filed on Sep. 18, 2015 in the United States Patent and Trademark Office and assigned Ser. No. 62/220,486, and to a U.S. Provisional Patent Application filed on Sep. 18, 2015 in the United States Patent and Trademark Office and assigned Ser. No. 62/220,469, the entire contents of each of which are incorporated herein by reference.

FIELD

The present disclosure relates generally to blind detection of precoding matrix index of interference, and more particularly, to blind detection of precoding matrix index of interference in a wireless communication system.

BACKGROUND

Joint detection (JD) or symbol-level interference cancellation (SLIC) may be deployed in a wireless communication system (e.g., long term evolution (LTE)) by identifying interference parameters at a serving user equipment (UE), including their ranks, precoding indices, and modulation orders, etc. For example, when channel reference signal (CRS) related transmission modes (TMs) are used, knowledge of precoding indices is required to estimate an effective channel matrix of interference.

A received signal may be expressed as in Equation (1) as follows:

$$y = H_S W_S x_S + H_I W_I x_I + n \qquad (1)$$

where the subscripts, S and I, indicate a serving signal and a dominant interfering signal respectively. For example, a dominant interfering signal is expressed and other interfering signals are combined into a noise vector. Using Equation (1), an interference rank, i.e., a number of columns in $W_I$, can be determined. Once the interference rank is determined, a matrix of $W_I$ is selected from a set of candidate precoding matrices.

If the rank of interference is 1, then there are four candidate precoding matrices.

If the rank of interference is 2, then there are 2 candidate precoding matrices.

SUMMARY

An apparatus is provided. The apparatus includes a receiver configured to receive a signal; a serving signal cancellation function block connected to the receiver and configured to remove a serving signal from the received signal to provide a residual signal; a blind detection of interference rank function block connected to the serving signal cancellation function block and configured to determine a rank of the residual signal, wherein the rank is one of a first rank and a second rank; and a precoding matrix index determination function block connected to the blind detection of interference rank function block and configured to determine a precoding matrix index based on the rank.

A method is provided. The method includes receiving a signal; cancelling a serving signal from the received signal to provide a residual signal; determining a rank of the residual signal, wherein the rank is one of a first rank and a second rank; and determining a precoding matrix index based on the rank.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3 is a flowchart of a method of determining a precoding matrix index of interference for rank 1 or rank 2 according to an embodiment of the present disclosure;

FIG. 4 is a flowchart of a method of determining a precoding matrix index of interference for rank 1 according to an embodiment of the present disclosure;

FIG. 5 is a flowchart of a method of determining a precoding matrix index of interference for rank 2 according to an embodiment of the present disclosure;

FIG. 8 is a diagram of four candidate precoding matrix indices of interference for rank 1 according to an embodiment of the present disclosure;

DETAILED DESCRIPTION OF EMBODIMENTS OF THE PRESENT DISCLOSURE

Figure 1:
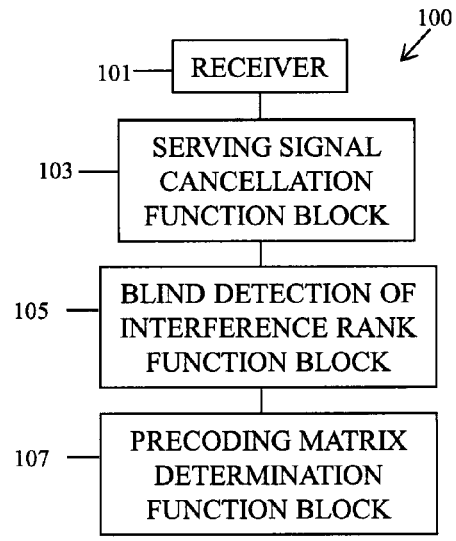
FIG. 1 is a block diagram of an apparatus for blind detection of a precoding matrix index of interference for rank 1 or rank 2 according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns an apparatus for and method of blind detection of interference rank information that has low complexity and low cost of implementation. While the present disclosure is described with regard to a wireless communication system (e.g., LTE), the present disclosure is not limited thereto, and is identically applicable to other suitable systems.

There is a need for an apparatus for and a method of blind detection of a precoding matrix index of interference in a wireless communication system that has low complexity and low cost of implementation.

FIG. 1 is a block diagram of an apparatus for blind detection of a precoding matrix index of interference for rank 1 or rank 2 according to an embodiment of the present disclosure.

Referring to FIG. 1, the apparatus 100 includes a receiver 101, a serving signal cancellation function block 103, a blind detection of interference rank function block 105, and a precoding matrix multiplier 107.

Figure 2:
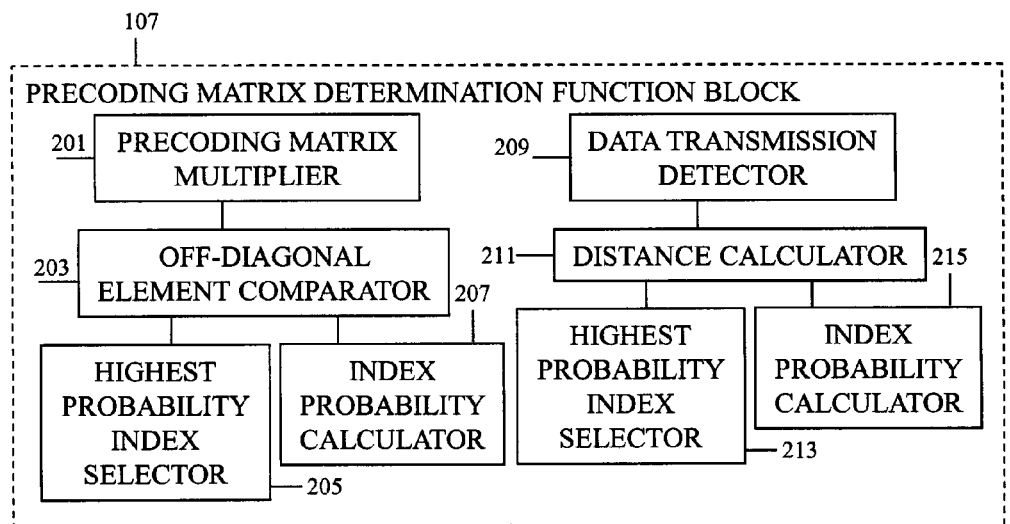
FIG. 2 is a block diagram of a precoding matrix determination function block of FIG. 1 according to an embodiment of the present disclosure.

FIG. 2 is a block diagram of a precoding matrix determination function block 107 of FIG. 1 according to an embodiment of the present disclosure.

Referring to FIG. 2, the precoding matrix determination function block 107 includes a precoding matrix multiplier 201, an off-diagonal element comparator 203 connected to the precoding matrix multiplier 201, a highest probability index selector 205 (e.g., a hard precoding matrix index selector) connected to the off diagonal element comparator 203, and an index probability calculator 207 (e.g., a probability generator for each candidate precoding matrix index) connected to the off-diagonal element comparator 203.

FIG. 3 is a flowchart of a method of determining a precoding matrix index of interference for rank 1 or rank 2 according to an embodiment of the present disclosure.

Referring to FIG. 3, the method includes receiving a signal at 301.

At 303, the method includes cancelling a serving signal from the received signal to provide a residual signal.

At 305, the method includes determining a rank of the residual signal, wherein the rank is one of a first rank and a second rank.

At 307, the method includes determining a precoding matrix index based on the rank.

FIG. 4 is a flowchart of a method of determining a precoding matrix index of interference for rank 1 according to an embodiment of the present disclosure.

Referring to FIG. 4, the method includes multiplying precoding matrices at 401.

At 403, the method includes comparing off-diagonal elements.

At 405, the method includes selecting a hard precoding matrix index by selecting a highest probability index.

At 407, the method includes generating a probability for each candidate precoding matrix index. A UE may dynamically select the hard precoding matrix index at 405 or generate the probability for each candidate precoding matrix index at 407 based on various factors of the UE, including, but not limited to a resource, a memory, a complexity, and a buffer.

FIG. 5 is a flowchart of a method of determining a precoding matrix index of interference for rank 2 according to an embodiment of the present disclosure.

Referring to FIG. 5, the method includes detecting data transmission at 501.

At 503, the method includes calculating, by a distance calculator for each modulation order, a distance of each modulation order of each candidate precoding matrix index.

At 505, the method includes selecting the highest probability index (e.g., making a hard determination of the precoding matrix index).

At 507, the method includes calculating index probabilities (e.g., determining a probability of being the precoding matrix index for each modulation order of each candidate precoding matrix index). A UE may dynamically select the highest probability index at 505 or calculate the index probabilities at 507 based on various factors of the UE, including, but not limited to a resource, a memory, a complexity, and a buffer.

Figure 6:
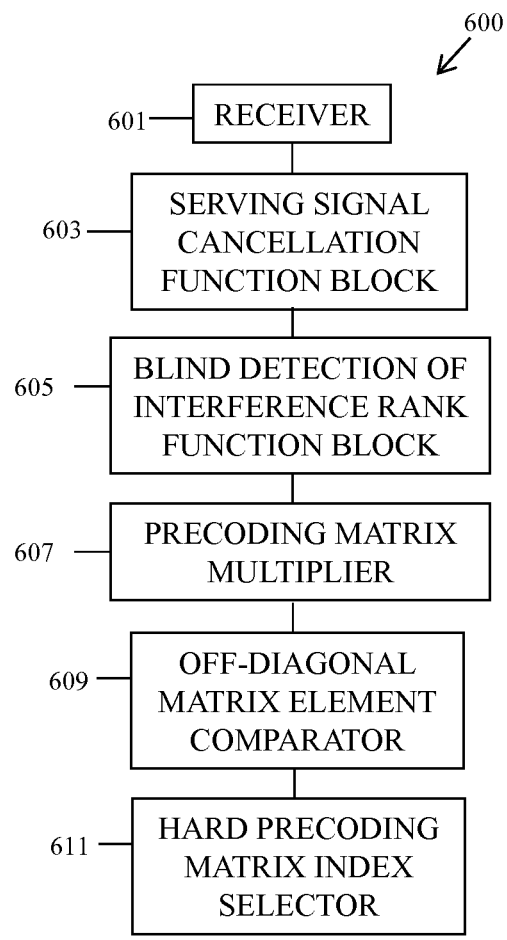
FIG. 6 is a block diagram of an apparatus for blind detection of a precoding matrix index of interference for rank 1 using a hard precoding matrix index according to an embodiment of the present disclosure.

FIG. 6 is a block diagram of an apparatus for blind detection of a precoding matrix index of interference for rank 1 using a hard precoding matrix index according to an embodiment of the present disclosure.

Referring to FIG. 6, the apparatus 600 includes a receiver 601, a serving signal cancellation function block 603, a blind detection of interference rank function block 605, a precoding matrix multiplier 607, an off-diagonal matrix element comparator 609, and a hard precoding matrix index selector 611.

The receiver 601 receives a signal (e.g., an LTE signal), where the received signal may be expressed as in Equation (1) above. However, the present disclosure is not limited to a case where only a single interference signal is present, but also applies to multiple interference signals, where a non-dominant interference signal may be treated as additional noise combined with background noise. In addition, $H_k$ is a channel matrix, $W_k$ is a precoding matrix, where k=S or I, and n is a noise vector.

In an embodiment of the present disclosure, Equation (1) is used to estimate an interference rank, i.e., a number of columns in $W_I$. The dimensions of the channel matrix $H_k$ are equal to the number of receive antennas by the number of transmit antennas, and the dimensions of the precoding matrix $W_k$ are equal to the number of transmit antennas by its rank.

A node of a communication network, for example, an evolved Node B (eNodeB) of a LTE radio access network, may choose from specified transmission modes (TMs). Presently, there are ten TMs from which to choose. For each present TM, the feasible number of a rank is either 1 or 2.

The serving signal cancellation function block 603 is connected to the receiver 601. The serving signal cancellation function block 603 cancels the serving signal $x_S$ from the signal received by the receiver 601. In an embodiment of the present disclosure, the serving signal $x_S$ is cancelled by converting Equation (1) above to Equation (2) as follows:

$$\tilde{y}=H_I W_I x_I+n \quad (2)$$

where $\tilde{y}$ is the result of cancelling the serving signal $x_S$ from the received signal.

Linear detection (e.g., MMSE) may be used to convert the received signal in Equation (2) above to be invariant of the instantaneous channel matrix $H_I$.

A noise distribution and signal gain is re-calculated as in Equation (3) as follows:

$$\hat{y} \sim \hat{W}_I x_I + \hat{n} \quad (3)$$

where a linear detection matrix is applied. Note that both the precoding matrix $W_k$ and the noise vector n are changed to $\hat{W}$ and $\hat{n}$, respectively, to compensate for the effect of linear detection. That is, linear detection does not completely remove a channel matrix. Thus, $\hat{W}_I$ and $\hat{n}$ are not identical to $W_I$ and n, respectively. Hence, Equation (3) is approximately obtained such that both the precoding matrix $W_I$ and the noise vector n are re-adjusted to $\hat{W}_I$ and $\hat{n}$, respectively. This step is significant in determining estimation accuracy.

Equation (3) above corresponds to a single resource element (RE) in which a source of interference is not changed. The number of REs having the same interference source depends on the wireless communication system (e.g., LTE) specification.

The received signal may also be expressed by Equation (4) below, where Equation (3) is a modification of Equation (1) above, and where the subscript k indicates an index of REs having the same source of interference. Moreover, a power allocation matrix $P_k$ is added for both serving and interfering signals, which is effectively combined into a channel matrix $H_k$. Equation (4) is as follows:

$$\tilde{y}_k = y_k - H_k^S P_k^S W_k^S x_k^S = H_k^I P_k^I W_k^I x_k^I + n_k = \tilde{H}_k^I W_k^I x_k^I + n_k \quad (4)$$

It is assumed that the transmission mode (TM) is a cell-specific reference signal (CRS) related mode such as transmission mode 4 (e.g., TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^S$, $P_k^S$, and $W_k^S$, can be measured. Regarding the serving data $x_k^S$, two or more scenarios may be considered. That is, treating interference as noise and attempting to decode a serving signal. If a CRC is passed, no more processing is required. Otherwise, the decoding result is re-used to generate a soft mean of $x_k^S$, or its hard symbol from a slicer function block. If the number of CRS samples is sufficient, $x_k^S$, may be a CRS symbol itself, indicating that it is known by the UE.

The effect of a channel matrix, $H_k$, can be equalized with linear detection, for example MMSE, as in Equation (5) as follows:

$$W_{mmse,k} = (\tilde{H}_k \tilde{H}_k^\dagger + \sigma^2 I_{N_r})^{-1} \tilde{H}_k = \tilde{H}_k (\tilde{H}_k^\dagger \tilde{H}_k + \sigma^2 I_{N_t})^{-1} \quad (5)$$

However, the present disclosure is not limited to using just MMSE for linear detection. Other types of linear detection may be used, for example, a zero-forcing (ZF) detector, and a ZF detector with decision-feedback. Any detection method that changes a form of "y=Hx+n" to the form of "y=Ax+v," where A is close to an identity matrix, may be used in the present disclosure.

Then, the received signal can be as in Equation (6) as follows:

$$\hat{y}_k = W_{mmse,k}^\dagger \tilde{y}_k = W_{mmse,k}^\dagger \tilde{H}_k W_k x_k + W_{mmse,k}^\dagger n_k \approx W_k x_k + n_k \quad (6)$$

The noise vector is changed from background white noise to MMSE-filtered noise. From Equation (6) above, the sample sum of the received signal is calculated as Equation (7) as follows:

$$S_n = \Sigma_{k=1}^n \hat{y}_k \hat{y}_k^\dagger \quad (7)$$

The MMSE-filtered noise covariance can be analytically derived or numerically calculated. If a channel matrix follows Rayleigh fading distribution, the statistical characteristics of MMSE-filtered noise could be analytically derived. The detail development is given below in Equations (8) to (13).

$$E[\tilde{n}_k \tilde{n}_k^\dagger] = E[W_{mmse,k}^\dagger n_k n_k^\dagger W_{mmse,k}] = E_W \\ [E_n[W_{mmse,k}^\dagger n_k n_k^\dagger W_{mmse,k}]|W_{mmse,k}] = E_W \\ [W_{mmse,k}^\dagger E_n[n_k n_k^\dagger] W_{mmse,k}|W_{mmse,k}] = \sigma^2 E_W \\ [W_{mmse,k}^\dagger W_{mmse,k}] = \sigma^2 E_W [(\tilde{H}_k^\dagger \tilde{H}_k + \sigma^2 I_{N_t})^{-1} \tilde{H}_k^\dagger \tilde{H}_k \\ (\tilde{H}_k^\dagger \tilde{H}_k + \sigma^2 I_{N_t})^{-1}] \quad (8)$$

Thus, the noise covariance is a function of $H_k^\dagger H_k$. Since $H_k^* H_k$ is a symmetric normal matrix, it can be decomposed to Equation (9) as follows:

$$E[\tilde{n}_k \tilde{n}_k^\dagger] = \sigma^2 E[Q_k(D_k + \sigma^2 I_{N_t})^{-\dagger} D_k (D_k + \sigma^2 I_{N_t})^{-1} Q_k^\dagger] = \sigma^2 E[Q_k \tilde{D}_k Q_k^\dagger] \quad (9)$$

where Equation (10) is as follows:

$$\tilde{D}_k = \begin{bmatrix} \begin{pmatrix} \frac{d_i}{(d_i + \sigma^2)^2} & \cdots & 0 \\ \vdots & \ddots & \vdots \\ 0 & \cdots & \frac{d_p}{(d_p + \sigma^2)^2} \end{pmatrix} \end{bmatrix} \quad (10)$$

The expected eigenvalue of $H_k^\dagger H_k$ is already tabulated. In particular, when p=2, the following is derived in Equation (11) as follows:

$$E[d_1] = \bar{d}_1 = \frac{7P}{2N_t} \text{ and } E[d_2] = \bar{d}_2 = \frac{P}{2N_t} \quad (11)$$

such that noise covariance for Rayleigh fading channel matrices can be expressed as Equation (12) as follows:

$$E[\tilde{n}_k \tilde{n}_k^\dagger] = \hat{\sigma}^2 I_{N_r} \quad (12)$$

where Equation (13) is as follows:

$$\hat{\sigma}^2 = \frac{\sigma^2}{p} \sum_{i=1}^{p} \frac{\bar{d}_i}{(\bar{d}_i + \sigma^2)^2} \quad (13)$$

If a channel matrix does not follow Rayleigh fading distribution, and is not independently and identically distributed (i.i.d.), then Equation (11) above is not true, and Equation (12) is not guaranteed to precisely hold. Alternatively, it is possible to measure $H_k^\dagger H_k$ directly and calculate Equation (11). In addition, Equation (12) could approximately hold unless the channel environment is in an extreme case.

Sample averages $\hat{y}_k \hat{y}_k^\dagger$ and $\tilde{n}_k \tilde{n}_k^\dagger$ are calculated.

The precoding matrix multiplier 607 in connected to the blind detection of interference rank function block 105. The precoding matrix multiplier 607 calculates a precoding matrix correlation, $W_k W_k^\dagger$. For example, $W_k W_k^\dagger$ can be calculated with a linear operation as in Equation (14) as follows:

$$\frac{1}{N} \sum_{k=1}^{N} \hat{y}_k \hat{y}_k^\dagger = W_k W_k^\dagger + \frac{1}{N} \sum_{k=1}^{N} \tilde{n}_k \tilde{n}_k^\dagger, \quad (14)$$

where N is the number of samples.

The blind detection of interference rank function block 605 is connected to the serving signal cancellation function block 603. From the output of the serving signal cancellation function block 603, the blind detection of interference rank function block 605 blindly determines the rank of interference (e.g., rank 1 or rank 2).

If the blind detection of interference rank function block 605 determines that the rank of the interference is 1, each combination of off-diagonal elements of $W_k W_k^\dagger$ is unique to each candidate index, and the precoding matrix index can be identified.

From Equation (6) above and the fact that $x_k$ is a quadrature amplitude modulation (QAM) symbol, Equation (4) above can be derived. For example, for an LTE radio access network, the precoding multiplication for rank 1 should be one of the four precoding matrix indexes illustrated in FIG. 3.

The off-diagonal matrix element comparator 609 is connected to the precoding matrix multiplier 607. The off-diagonal matrix element comparator 609 compares the off-diagonal elements of the $W_k W_k^\dagger$ to determine the precoding matrix index.

All of the diagonal elements of the four precoding matrix indexes illustrated in FIG. 3 are [1 1]. However, the off-diagonal elements have different combinations of values. Thus, after calculating Equation (15) as follows:

$$D_e = \frac{1}{N} \sum_k \hat{y}_k \hat{y}_k^\dagger - \frac{1}{N} \sum_k \tilde{n}_k \tilde{n}_k^\dagger, \quad (15)$$

the signs, real parts, and imaginary parts of the off-diagonal elements of $D_e$ are used to determine the precoding matrix index.

In addition, when a channel follows a Rayleigh fading distribution, $E[\tilde{n}_k \tilde{n}_k^*]$ is a diagonal matrix such that $$\frac{1}{N} \sum_k \tilde{n}_k \tilde{n}_k^\dagger$$

may also be considered a diagonal matrix. Thus, the off-diagonal terms may be negligible. To minimize computation, $$\frac{1}{N} \sum_k \hat{y}_k \hat{y}_k^\dagger$$

is used for differentiating off-diagonal terms.

As illustrated in FIG. 8, if off-diagonal elements 2 and 3 are 1 and 1, respectively, where 1 is a real value, the precoding matrix index is 1. If off-diagonal elements 2 and 3 are −1 and −1, respectively, where −1 is a real value, the precoding matrix index is 2. If off-diagonal elements 2 and 3 are −j and j, respectively, where −j and j are imaginary values, the precoding matrix index is 3, and if off-diagonal elements 2 and 3 are j and −j, respectively, the precoding matrix index is 4

The hard precoding matrix index selector 611 is connected to the off-diagonal matrix element comparator 609. The hard precoding matrix index selector 611 makes a hard decision that the precoding matrix index is the most likely precoding matrix index from the results of the off-diagonal matrix element comparator 609.

In addition, when a channel follows a Rayleigh fading distribution, $E[\tilde{n}_k \tilde{n}_k^\dagger]$ is a $$\frac{1}{N} \sum_k \tilde{n}_k \tilde{n}_k^\dagger$$

diagonal matrix such that may also be considered a diagonal matrix. Thus, the off-diagonal terms may be negligible. To minimize computation, $$\frac{1}{N} \sum_k \hat{y}_k \hat{y}_k^\dagger$$

is used for differentiating off-diagonal terms.

Figure 7:
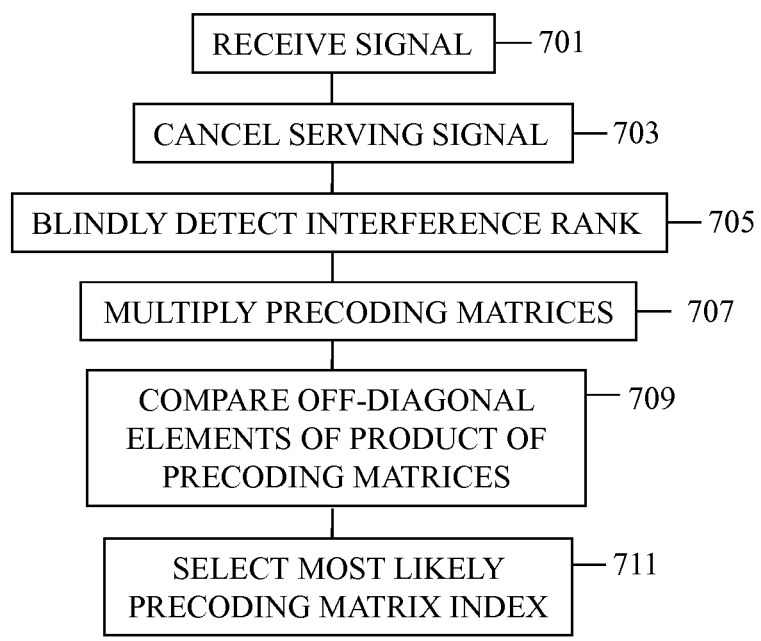
FIG. 7 is a flowchart of a method of blind detection of a precoding matrix index of interference for rank 1 using a hard precoding matrix index according to an embodiment of the present disclosure.

FIG. 7 is a flowchart of a method of blind detection of a precoding matrix index of interference for rank 1 using a hard precoding matrix index according to an embodiment of the present disclosure.

Referring to FIG. 7, at 701, a signal (e.g., an LTE signal) is received, by a receiver, where the received signal may be expressed as in Equation (1) above. However, the present disclosure is not limited to a case where only a single interference signal is present, but also applies to multiple interference signals, where a non-dominant interference signal may be treated as additional noise combined with background noise.

At 704, the serving signal $x_S$ is cancelled from the signal received by the receiver. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated. If a channel matrix follows Rayleigh fading distribution, the statistical characteristics of MMSE-filtered noise could be analytically derived as described above.

Sample averages $\hat{y}_k \hat{y}_k^\dagger$ and $\tilde{n}_k \tilde{n}_k^\dagger$ are calculated.

At 705, a rank of interference is blindly detected (e.g., rank 1 or rank 2).

At 707, a precoding matrix correlation, $W_k W_k^\dagger$ is calculated using a precoding matrix multiplier, as in Equation (14) above, for example.

If the rank of interference is blindly detected as rank 1, each combination of off-diagonal elements of $W_k W_k^\dagger$ is unique to each candidate index, and the precoding matrix index can be identified.

At 709, the off-diagonal elements of the $W_k W_k^\dagger$ are compared to determine the precoding matrix index. The precoding matrix index may be determined by the method illustrated in FIG. 9 and described above.

At 711, a hard decision is made, by a hard precoding matrix index selector, that the precoding matrix index is the most likely precoding matric index from the results of the off-diagonal matrix element comparison at 709.

Figure 9:
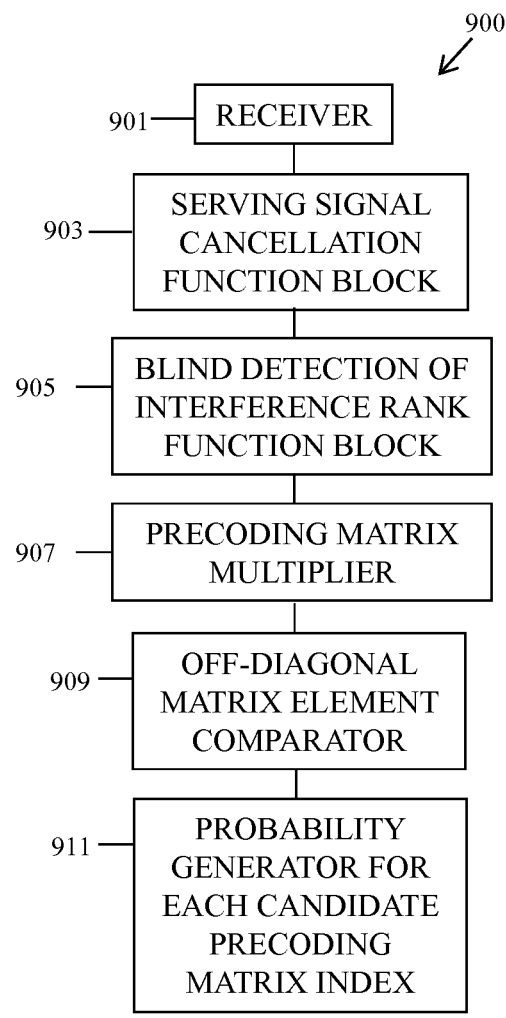
FIG. 9 is a block diagram of an apparatus for blind detection of a precoding matrix index of interference for rank 1 using a soft precoding matrix index according to an embodiment of the present disclosure.

FIG. 9 is a block diagram of an apparatus for blind detection of a precoding matrix index of interference for rank 1 using a soft precoding matrix index according to an embodiment of the present disclosure.

Referring to FIG. 9, the apparatus 900 includes a receiver 901, a serving signal cancellation function block 903, a blind detection of interference rank function block 905, a precoding matrix multiplier 907, an off-diagonal matrix element comparator 909, and a probability generator for each candidate precoding matrix index 911.

The receiver 901 receives a signal (e.g., an LTE signal), where the received signal may be expressed as in Equation (1) above. However, the present disclosure is not limited to a case where only a single interference signal is present, but also applies to multiple interference signals, where a non-dominant interference signal may be treated as additional noise combined with background noise.

The serving signal cancellation function block 903 is connected to the receiver 901. The serving signal cancellation function block 903 cancels the serving signal $x_S$ from the signal received by the receiver 901. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above, where Equation (3) is a modification of Equation (1) above, and where the subscript k indicates an index of REs having the same source of interference.

It is assumed that the transmission mode (TM) is a cell-specific reference signal (CRS) related mode such as transmission mode 4 (e.g., TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^S$, $P_k^S$, and $W_k^S$, can be measured. Regarding the serving data $x_k^S$, two or more scenarios may be considered. That is, treating interference as noise and attempting to decode a serving signal. If a CRC is passed, no more processing is required. Otherwise, the decoding result is re-used to generate a soft mean of $x_k^S$, or its hard symbol from a slicer function block. If the number of CRS samples is sufficient, $x_k^S$ may be a CRS symbol itself, indicating that it is known by the UE.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated.

Sample averages $\hat{y}_k \hat{y}_k^\dagger$ and $\tilde{n}_k \tilde{n}_k^\dagger$ are calculated.

The blind detection of interference rank function block 905 is connected to the serving signal cancellation function block 903. From the output of the serving signal cancellation function block 903, the blind detection of interference rank function block 905 blindly determines the rank of interference (e.g., rank 1 or rank 2).

The precoding matrix multiplier 907 in connected to the blind detection of interference rank function block 905. The precoding matrix multiplier 907 calculates a precoding matrix correlation, $W_k W_k^\dagger$. For example, $W_k W_k^\dagger$ can be calculated with a linear operation as in Equation (14) above.

If the blind detection of interference rank function block 905 determines that the rank of the interference is 1, each combination of off-diagonal elements of $W_k W_k^\dagger$ is unique to each candidate index, and the precoding matrix index can be identified.

From Equation (6) above and the fact that $x_k$ is a quadrature amplitude modulation (QAM) symbol, Equation (4) above can be derived. For example, for a LTE radio access network, the precoding multiplication for rank 1 should be one of the four precoding matrix indexes illustrated in FIG. 8.

The off-diagonal matrix element comparator 909 is connected to the precoding matrix multiplier 907. The off-diagonal matrix element comparator 909 compares the off-diagonal elements of the $W_k W_k^\dagger$ to determine the precoding matrix index.

All of the diagonal elements of the four precoding matrix indexes illustrated in FIG. 8 are [1 1]. However, the off-diagonal elements have different combinations of values. Thus, after calculating Equation (15), above the signs, real parts, and imaginary parts of the off-diagonal elements of $D_e$ are used to determine the precoding matrix index.

In addition, when a channel follows a Rayleigh fading distribution, $E[\tilde{n}_k\tilde{n}_k^\dagger]$ is a diagonal matrix such that $$\frac{1}{N}\sum_k \tilde{n}_k \tilde{n}_k^\dagger$$

may also be considered to be a diagonal matrix. Thus, the off-diagonal terms may be negligible. To minimize computation, $$\frac{1}{N}\sum_k \hat{y}_k \hat{y}_k^\dagger$$

is used for differentiating off-diagonal terms.

The probability generator for each candidate precoding matrix index 911 is connected to the off-diagonal matrix element comparator 909. The probability generator for each candidate precoding matrix index 911 makes a soft decision concerning the precoding matrix index. That is, the probability generator for each candidate precoding matrix index 911 determines a probability for each candidate precoding matrix index that each candidate precoding matrix index is the precoding matrix index.

In addition, when a channel follows a Rayleigh fading distribution, $E[\tilde{n}_k\tilde{n}_k^\dagger]$ is a diagonal matrix such that $$\frac{1}{N}\sum_k \tilde{n}_k \tilde{n}_k^\dagger$$

may also be considered a diagonal matrix. Thus, the off-diagonal terms may be negligible. To minimize computation, $$\frac{1}{N}\sum_k \hat{y}_k \hat{y}_k^\dagger$$

is used for differentiating off-diagonal terms.

Figure 10:
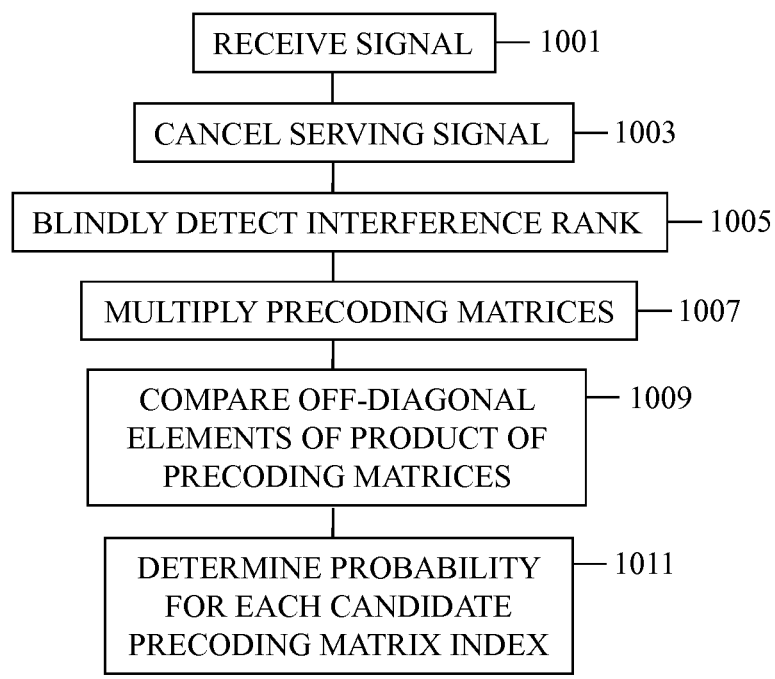
FIG. 10 is a flowchart of a method of blind detection of a precoding matrix index of interference for rank 1 using a soft precoding matrix index according to an embodiment of the present disclosure.

FIG. 10 is a flowchart of a method of blind detection of a precoding matrix index of interference for rank 1 using a soft precoding matrix index according to an embodiment of the present disclosure.

Referring to FIG. 10, at 1001, a signal (e.g., an LTE signal) is received, by a receiver, where the received signal may be expressed as in Equation (1) above. However, the present disclosure is not limited to a case where only a single interference signal is present, but also applies to multiple interference signals, where a non-dominant interference signal may be treated as additional noise combined with background noise.

At 1003, the serving signal $x_S$ is cancelled from the signal received by the receiver. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated. If a channel matrix follows Rayleigh fading distribution, the statistical characteristics of MMSE-filtered noise could be analytically derived as described above.

Sample averages $\hat{y}_k\hat{y}_k^\dagger$ and $\tilde{n}_k\tilde{n}_k^\dagger$ are calculated.

At 1005, a rank of interference is blindly detected (e.g., rank 1 or rank 2).

At 1007, a precoding matrix correlation, $W_k W_k^\dagger$ is calculated using a precoding matrix multiplier, as in Equation (14) above, for example.

If the rank of interference is blindly detected as rank 1, each combination of off-diagonal elements of $W_kW_k^\dagger$ is unique to each candidate index, and the precoding matrix index can be identified.

At 1009, the off-diagonal elements of the $W_kW_k^\dagger$ are compared to determine the precoding matrix index.

At 1011, a soft decision is made, by a probability generator for each candidate precoding matrix index. That is, the probability generator for each candidate precoding matrix index determines a probability for each candidate precoding matrix index that each candidate is the precoding matrix index.

Figure 11:
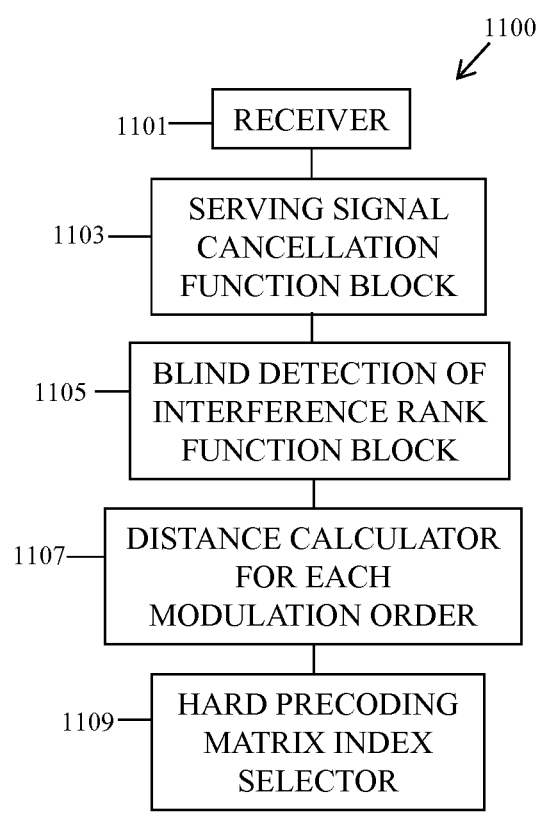
FIG. 11 is a block diagram of an apparatus for blind detection of a precoding matrix index of interference for rank 2 using a hard precoding matrix index according to an embodiment of the present disclosure.

FIG. 11 is a block diagram of an apparatus for blind detection of a precoding matrix index of interference for rank 2 using a hard precoding matrix index according to an embodiment of the present disclosure.

Referring to FIG. 11, the apparatus 1100 includes a receiver 1101, a serving signal cancellation function block 1103, a blind detection of interference rank function block 1105, a distance calculator for each modulation order 1107, and hard precoding matrix index selector 1109.

The receiver 1101 receives a signal (e.g., an LTE signal), where the received signal may be expressed as in Equation (1) above. However, the present disclosure is not limited to a case where only a single interference signal is present, but also applies to multiple interference signals, where a non-dominant interference signal may be treated as additional noise combined with background noise.

The serving signal cancellation function block 1103 is connected to the receiver 1101. The serving signal cancellation function block 1103 cancels the serving signal $x_S$ from the signal received by the receiver 1101. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above, where Equation (3) is a modification of Equation (1) above, and where the subscript k indicates an index of REs having the same source of interference.

It is assumed that the transmission mode (TM) is a cell-specific reference signal (CRS) related mode such as transmission mode 4 (e.g., TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^S$, $P_k^S$, and $W_k^S$, can be measured. Regarding the serving data $x_k^S$, two or more scenarios may be considered. That is, treating interference as noise and attempting to decode a serving signal. If a CRC is passed, no more processing is required. Otherwise, the decoding result is re-used to generate a soft mean of $x_k^S$, or its hard symbol from a slicer function block. If the number of CRS samples is sufficient, $x_k^S$ may be a CRS symbol itself, indicating that it is known by the UE.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated.

Sample averages $\hat{y}_k \hat{y}_k^\dagger$ and $\tilde{n}_k \tilde{n}_k^\dagger$ are calculated.

The blind detection of interference rank function block 1105 is connected to the serving signal cancellation function block 1103. From the output of the serving signal cancellation function block 1103, the blind detection of interference rank function block 1105 blindly determines the rank of interference (e.g., rank 1 or rank 2).

The distance calculator for each modulation order 1107 in connected to the blind detection of interference rank function block 1105. The distance calculator for each modulation order 1107 calculates a distance (e.g., an ED) for each modulation order of each candidate precoding matrix index.

If the blind detection of interference rank function block 1105 determines that the rank of the interference is 2, there are only two possible candidates for the precoding matrix index, and $W_k W_k^\dagger$ is the same as an identity matrix divided by 2 for both candidates.

Since interference modulation of the interference is not known at this point, a related art method using EDs where interference modulation may be 4QAM, 16QAM, 64QAM, or 256QAM generates $4^2+16^2+64^2=4368$ EDs per candidate precoding matrix index and compares them to determine the minimum ED, in which the number of receive antennas is assumed to be 2. This number of EDs is difficult to generate. Instead, an embodiment of the present disclosure calculates one ED for each of the possible modulation order for each candidate precoding matrix index (e.g., only 3 EDs per candidate precoding matrix index for 4QAM, 16QAM, 64QAM, and 256QAM), where a slicer may be used to reduce complexity.

If the interference rank is identified as rank 2, the candidate precoding index matrices are as in Table 1 below:

TABLE 1

$$\frac{1}{2}\begin{bmatrix} 1 & 1 \\ 1 & -1 \end{bmatrix}, \frac{1}{2}\begin{bmatrix} 1 & 1 \\ j & -j \end{bmatrix}$$

Both candidate precoding matrices have the same results as $W_i W_i^\dagger = \frac{1}{2}I_2$, where i=1 or 2. Therefore, a linear method is not preferred to differentiate both matrices, $W_i$.

Instead, an embodiment of the present disclosure calculates a distance for each candidate precoding matrix index. For example, an ED is calculated as in Equation 16 as follows:

$$g(\tilde{x}_k(i)) = \|\tilde{y}_k - \tilde{H}_k W_i \tilde{x}_i\|^2, \quad (16)$$

where $\tilde{x}_i$ could be obtained from $\hat{x}_i$ using a slicer.

From Equation (6) above, $\hat{x}_i$ can be obtained from Equation 17 as follows:

$$\hat{x}_i = W_i^{-1} \hat{y}_k \quad (17)$$

Alternatively, $\hat{x}_i$ could be directly calculated from MMSE detection of Equation (4) above as Equation (18) as follows:

$$\hat{W}_{mmse,(i)} = \left(\frac{\tilde{H}_k \tilde{H}_k^\dagger}{2} + \sigma^2 I_{N_r}\right)^{-1} \tilde{H}_k W_i \quad (18)$$

$$\hat{x}_i = \hat{W}_{mmse,(i)}^\dagger \tilde{y}_k$$

where Equation (18) above is more accurate than Equation (17) above, but requires additional calculations. Since the modulation order of interference is not known at this point, distance (e.g., ED) in Equation (16) above is required to be calculated for each possible modulation order (e.g., 4QAM, 16QAM, 64QAM, and 256QAM) for each candidate precoding matrix index, and the results are compared. However, the present disclosure is not limited to using just MMSE for linear detection. Other types of linear detection may be used, for example, a zero-forcing (ZF) detector, and a ZF detector with decision-feedback. Any detection method that changes a form of "y=Hx+n" to the form of "y=Ax+v," where A is close to an identity matrix, may be used in the present disclosure.

The index k denotes a sample index.

In contrast to a maximum likelihood (ML) method or an approximated ML method, an embodiment of the present disclosure uses a combination of linear detection and a slicing operation to reduce complexity. Thus, for each possible modulation order only one distance calculation (e.g., an ED as in Equation (16) above) is required per modulation order of the interference.

The hard precoding matrix index selector 1109 is connected to the distance calculator for each modulation order 1107. The hard precoding matrix index selector 1109 makes a hard decision concerning the precoding matrix index. That is, the hard precoding matrix index selector 1109 determines that the precoding matrix index is the one with the minimum distance calculated by the distance calculator for each modulation order 1107.

Figure 12:
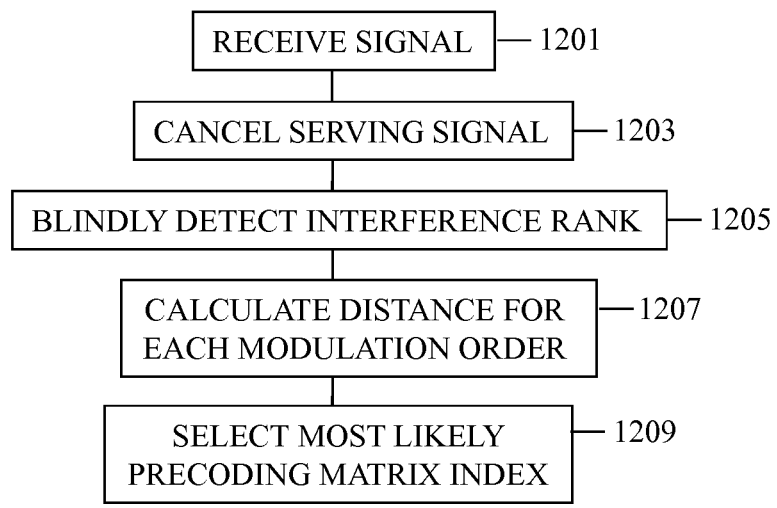
FIG. 12 is a flowchart of a method of blind detection of a precoding matrix index of interference for rank 2 using a hard precoding matrix index according to an embodiment of the present disclosure.

FIG. 12 is a flowchart of a method of blind detection of a precoding matrix index of interference for rank 2 using a hard precoding matrix index according to an embodiment of the present disclosure.

Referring to FIG. 12, at 1201, a signal (e.g., an LTE signal) is received, by a receiver, where the received signal may be expressed as in Equation (1) above. However, the present disclosure is not limited to a case where only a single interference signal is present, but also applies to multiple interference signals, where a non-dominant interference signal may be treated as additional noise combined with background noise.

At 1203, the serving signal $x_S$ is cancelled from the signal received by the receiver. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated. If a channel matrix follows Rayleigh fading distribution, the statistical characteristics of MMSE-filtered noise could be analytically derived as described above.

Sample averages $\hat{y}_k \hat{y}_k^\dagger$ and $\tilde{n}_k \tilde{n}_k^\dagger$ are calculated.

At 1205, a rank of interference is blindly detected (e.g., rank 1 or rank 2).

At 1207, a distance (e.g., an ED) is calculated, by a distance calculator, for each modulation order for each modulation order or each candidate precoding matrix index.

If the interference rank is identified as rank 2, the candidate precoding index matrices are as in Table 1 above.

Both candidate precoding matrices have the same results as $W_i W_i^\dagger = \frac{1}{2} I_2$, where i=1 or 2. Therefore, a linear method is not preferred to differentiate both matrices, $W_i$.

Instead, an embodiment of the present disclosure calculates a distance for each modulation order or each candidate precoding matrix index. For example, an ED is calculated as in Equation 16 above, where $\tilde{x}_i$ could be obtained from $\hat{x}_i$ using a slicer.

From Equation (6) above, $\hat{x}_i$ can be obtained from Equation 17 above.

Alternatively, $\hat{x}_i$ could be directly calculated from MMSE detection of Equation (4) above as Equation (18) above, where Equation (18) above is more accurate than Equation (17) above, but requires additional calculations. Since the modulation order of interference is not known at this point, distance (e.g., ED) in Equation (16) above is required to be calculated for each possible modulation order (e.g., 4QAM, 16QAM, 64QAM, and 256QAM) and the results compared.

At 1209, a hard decision concerning the precoding matrix index is made. That is, the precoding matrix index is determined by a hard precoding matrix index selector 1109 to be the one with the minimum distance calculated by the distance calculator for each modulation order.

Figure 13:
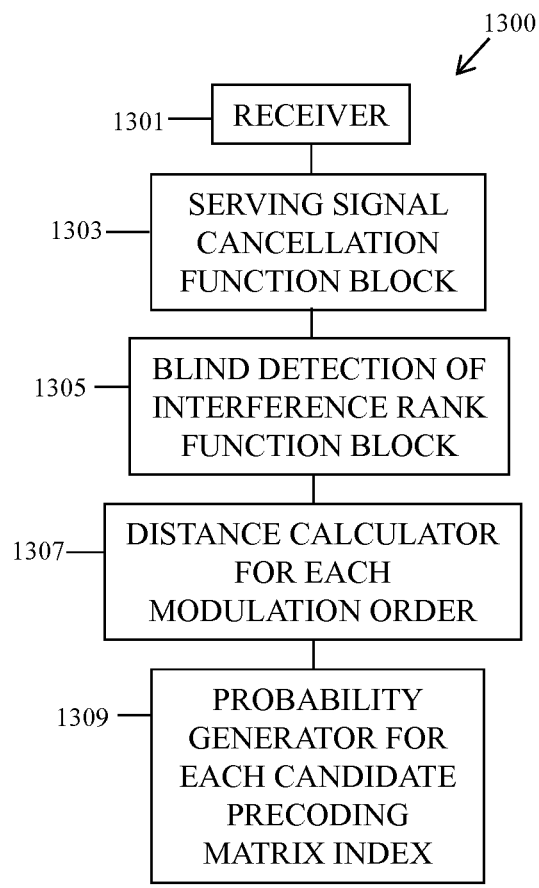
FIG. 13 is a block diagram of an apparatus for blind detection of a precoding matrix index of interference for rank 2 using a soft precoding matrix index according to an embodiment of the present disclosure.

FIG. 13 is a block diagram of an apparatus for blind detection of a precoding matrix index of interference for rank 2 using a soft precoding matrix index according to an embodiment of the present disclosure.

Referring to FIG. 13, the apparatus 1300 includes a receiver 1301, a serving signal cancellation function block 1303, a blind detection of interference rank function block 1305, a distance calculator for each modulation order 1307, and a probability generator for each candidate precoding matrix index 1309.

The receiver 1301 receives a signal (e.g., an LTE signal), where the received signal may be expressed as in Equation (1) above. However, the present disclosure is not limited to a case where only a single interference signal is present, but also applies to multiple interference signals, where a non-dominant interference signal may be treated as additional noise combined with background noise.

The serving signal cancellation function block 1303 is connected to the receiver 1301. The serving signal cancellation function block 1303 cancels the serving signal $x_S$ from the signal received by the receiver 1301. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above, where Equation (3) is a modification of Equation (1) above, and where the subscript k indicates an index of REs having the same source of interference.

It is assumed that the transmission mode (TM) is a cell-specific reference signal (CRS) related mode such as transmission mode 4 (e.g., TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^S$, $P_k^S$, and $W_k^S$, can be measured. Regarding the serving data $x_k^S$, two or more scenarios may be considered. That is, treating interference as noise and attempting to decode a serving signal. If a CRC is passed, no more processing is required. Otherwise, the decoding result is re-used to generate a soft mean of $x_k^S$, or its hard symbol from a slicer function block. If the number of CRS samples is sufficient, $x_k^S$ may be a CRS symbol itself, indicating that it is known by the UE.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated.

Sample averages $\hat{y}_k \hat{y}_k^\dagger$ and $\tilde{n}_k \tilde{n}_k^\dagger$ are calculated.

The blind detection of interference rank function block 1305 is connected to the serving signal cancellation function block 1303. From the output of the serving signal cancellation function block 1303, the blind detection of interference rank function block 1305 blindly determines the rank of interference (e.g., rank 1 or rank 2).

The distance calculator for each modulation order 1307 is connected to the blind detection of interference rank function block 1305. The distance calculator 1307 calculates a distance (e.g., an ED) for each modulation order of each candidate precoding matrix index.

If the blind detection of interference rank function block 1305 determines that the rank of the interference is 2, there are only two possible candidates for the precoding matrix index, and $W_k W_k^\dagger$ is the same as an identity matrix divided by 2 for both candidate precoding matrix indexes.

Since interference modulation of the interference is not known at this point, a related art method using EDs, where interference modulation may be 4QAM, 16QAM, 64QAM, or 256QAM, generates $4^2+16^2+64^2=4368$ EDs per candidate precoding matrix index and compares them to determine the minimum ED, where the number of receive antennas is assumed to be 2. This number of EDs is difficult to generate. Instead, an embodiment of the present disclosure calculates one ED for each possible modulation order of each candidate precoding matrix index (e.g., only 3 EDs per candidate precoding matrix index for 4QAM, 16QAM, 64QAM, and 256QAM modulation orders), where a slicer may be used to reduce complexity.

If the interference rank is identified as rank 2, the candidate precoding index matrices are as in Table 1 above.

Both candidate precoding matrices have the same results as $W_i W_i^\dagger = \frac{1}{2}I_2$, where i=1 or 2. Therefore, a linear method is not preferred to differentiate both matrices, $W_i$.

Instead, an embodiment of the present disclosure calculates a distance for each modulation order of each candidate precoding matrix index. For example, an ED is calculated as in Equation 16 above, where $\tilde{x}_i$ could be obtained by using a slicer from $\hat{x}_i$.

From Equation (6) above, $\hat{x}_i$ can be obtained from Equation 17 above.

Alternatively, $\hat{x}_i$ could be directly calculated from MMSE detection of Equation (4) above as Equation (18) above, where Equation (18) above is more accurate than Equation (17) above, but requires additional calculations. Since the modulation order of interference is not known at this point, distance (e.g., ED) in Equation (16) above is required to be calculated for each possible modulation order (e.g., 4QAM, 16QAM, 64QAM, 256QAM etc.) for each candidate precoding matrix index, and the results are compared.

The probability generator for each candidate precoding matrix index 1309 is connected to the distance calculator for each modulation order 1307. The probability generator for each candidate precoding matrix index 1309 makes a soft decision concerning the precoding matrix index. That is, the probability generator for each candidate precoding matrix index 1309 determines a probability for each modulation order for each candidate precoding matrix index.

Figure 14:
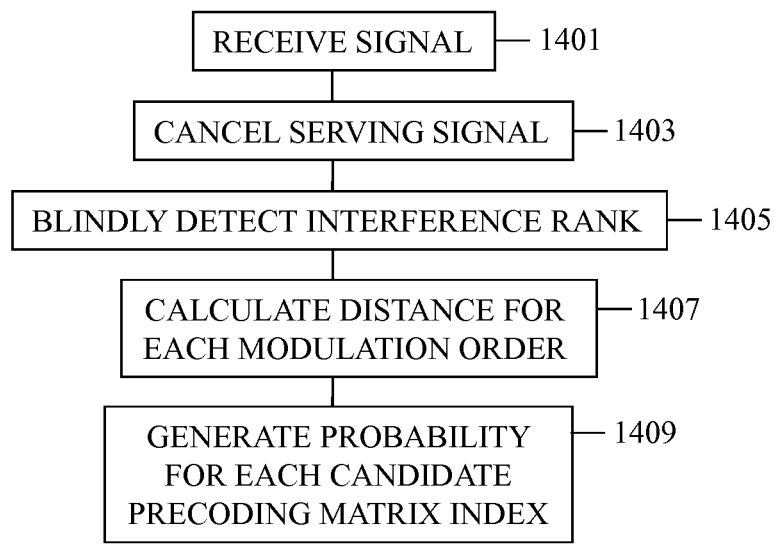
FIG. 14 is a flowchart of a method of blind detection of a precoding matrix index of interference for rank 2 using a soft precoding matrix index according to an embodiment of the present disclosure.

FIG. 14 is a flowchart of a method of blind detection of a precoding matrix index of interference for rank 2 using a soft precoding matrix index according to an embodiment of the present disclosure.

Referring to FIG. 14, at 1401, a signal (e.g., an LTE signal) is received, by a receiver, where the received signal may be expressed as in Equation (1) above. However, the present disclosure is not limited to a case where only a single interference signal is present, but also applies to multiple interference signals, where a non-dominant interference signal may be treated as additional noise combined with background noise.

At 1403, the serving signal $x_S$ is cancelled from the signal received by the receiver. In an embodiment of the present disclosure, the serving signal $x_S$ is cancelled by converting Equation (1) above to Equation (2) above.

Linear detection (e.g., MMSE) may be used to convert the received signal in Equation (2) above to be invariant of the instantaneous channel matrix $H_1$.

A noise distribution and signal gain is re-calculated as in Equation (3) above.

The received signal may also be expressed by Equation (4) above.

The effect of a channel matrix, $H_k$, can be equalized with linear detection, MMSE, as in Equation (5) above.

Then, the received signal can be as in Equation (6) above.

The noise vector is changed from background white noise to MMSE-filtered noise. From Equation (6) above, the sample sum of the received signal is calculated as Equation (7) above.

The MMSE-filtered noise covariance can be analytically derived or numerically calculated. If a channel matrix follows Rayleigh fading distribution, the statistical characteristics of MMSE-filtered noise could be analytically derived as described above.

Sample averages $\hat{y}_k \hat{y}_k^\dagger$ and $\tilde{n}_k \tilde{n}_k^\dagger$ are calculated.

At 1405, a rank of interference is blindly detected (e.g., rank 1 or rank 2).

At 1407, a distance (e.g., an ED) is calculated for each modulation order of each candidate precoding matrix index by a distance calculator.

If the interference rank is identified as rank 2, the candidate precoding index matrices are as in Table 1 above.

Both candidate precoding matrices have the same results as $W_i W_i^\dagger = \frac{1}{2}I_2$, where i=1 or 2. Therefore, a linear method is not preferred to differentiate both matrices, $W_i$.

Instead, an embodiment of the present disclosure calculates a distance for each modulation order of each candidate precoding matrix index. For example, an ED is calculated as in Equation 16 above, where $\tilde{x}_i$ could be obtained from $\hat{x}_i$ using a slicer.

From Equation (6) above, $\hat{x}_i$ can be obtained from Equation 17 above.

Alternatively, $\hat{x}_i$ could be directly calculated from MMSE detection of Equation (4) above as Equation (18) above, where Equation (18) above is more accurate than Equation (17) above, but requires additional calculations. Since the modulation order of interference is not known at this point, distance (e.g., ED) in Equation (16) above is required to be calculated for each possible modulation order (e.g., 4QAM, 16QAM, 64QAM, and 256QAM) for each candidate precoding matrix index, and the results are compared.

At 1409, a soft decision concerning the precoding matrix index is made. That is, a probability is determined for each modulation order for each candidate precoding matrix index.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
    a receiver configured to receive a signal;
    a serving signal cancellation function block connected to the receiver and configured to remove a serving signal from the received signal to provide a residual signal;
    a blind detection of interference rank function block connected to the serving signal cancellation function block and configured to determine a rank of the residual signal, wherein the rank is one of a first rank and a second rank; and
    a precoding matrix index determination function block connected to the blind detection of interference rank function block and configured to determine a precoding matrix index based on the rank.

2. The apparatus of claim 1, wherein the precoding matrix index determination function block is comprised of:
    a precoding matrix multiplier connected to the blind detection of interference rank function block;
    an off-diagonal element comparator connected to the precoding matrix multiplier;
    a hard precoding matrix index selector connected to the off diagonal element comparator; and
    a probability generator for each candidate precoding matrix index connected to the off-diagonal element comparator.

3. The apparatus of claim 1, wherein the serving signal cancellation function block is further configured to cancel a serving signal from a received signal so that the cancelled signal is represented by either ỹ=H$_I$W$_I$+n or ỹ$_k$=H̃$_k^I$W$_k^I$x$_k^I$+n$_k$, where H$_I$ is a channel matrix of an interference signal, W$_I$ is a precoding matrix of the interference signal, x$_I$ is the interference signal, n is a noise vector, H̃$_k^I$ is a channel matrix of an interference signal, W$_k^I$ is a precoding matrix of the interference signal, x$_k^I$ is the interference signal, n$_k$ is a noise vector, and k indicates an index of resource elements having a common source of interference.

4. The apparatus of claim 2, wherein the off-diagonal matrix element comparator is configured to determine that the precoding matrix index is precoding matrix index 1 if off-diagonal elements 2 and 3 of a precoding matrix correlation W$_k$W$_k^\dagger$ are both real value 1, the precoding matrix index is precoding matrix index 2 if the off-diagonal elements 2 and 3 of the precoding matrix correlation W$_k$W$_k^\dagger$ are both real value −1, the precoding matrix index is precoding matrix index 3 if the off-diagonal elements 2 and 3 of the precoding matrix correlation W$_k$W$_k^\dagger$ are imaginary values −j and j, respectively, and the precoding matrix index is precoding matrix index 4 if the off-diagonal elements 2 and 3 of the precoding matrix correlation W$_k$W$_k^\dagger$ are imaginary values j and −j, respectively.

5. The apparatus of claim 2, wherein precoding matrix index 1, precoding matrix index 2, precoding matrix index 3, and precoding matrix index 4 are $$\frac{1}{2}\begin{bmatrix}1 & 1\\ 1 & 1\end{bmatrix}, \frac{1}{2}\begin{bmatrix}1 & -1\\ -1 & 1\end{bmatrix}, \frac{1}{2}\begin{bmatrix}1 & -j\\ j & 1\end{bmatrix}, \text{and } \frac{1}{2}\begin{bmatrix}1 & j\\ -j & 1\end{bmatrix},$$

respectively.

6. The apparatus of claim 1, wherein the precoding matrix index determination function block is comprised of:
a distance calculator for each modulation order connected to the blind detection of interference rank function block; and
a hard precoding matrix index selector connected to the distance calculator; and
a probability generator for each candidate precoding matrix index connected to the distance calculator.

7. The apparatus of claim 5, wherein the distance calculator for each modulation order is configured to calculate a distance for each possible modulation order for each candidate precoding matrix index.

8. The apparatus of claim 6 wherein the precoding matrix index determination function block is configured to determine the precoding matrix index having a minimum distance as the precoding matrix index of the interference or determine a probability for each modulation order of each candidate precoding matrix index.

9. The apparatus of claim 8, wherein the distance is a Euclidian distance.

10. The apparatus of claim 7, wherein the modulation order is one of 4 quadrature amplitude modulation 4QAM, 16QAM, 64QAM, or 256QAM.

11. A method, comprising:
receiving, by a receiver, a signal;
cancelling, by a serving signal cancellation function block, a serving signal from the received signal to provide a residual signal;
determining, by a blind detection of interference rank function block, a rank of the residual signal, wherein the rank is one of a first rank and a second rank; and
determining, by a precoding matrix index determination function block, a precoding matrix index of interference based on the rank.

12. The method of claim 11, wherein determining the precoding matrix index of interference is comprised of:
multiplying precoding matrices;
comparing off-diagonal elements; and
either selecting a hard precoding matrix index or generating a probability for each candidate precoding matrix index.

13. The method of claim 11, wherein cancelling the serving signal is comprised of cancelling the serving signal from the received signal so that the cancelled signal is represented by either ỹ=H$_I$W$_I$+n or ỹ$_k$=H̃$_k^I$W$_k^I$x$_k^I$+n$_k$, where H$_I$ is a channel matrix of the interference, W$_I$ is a precoding matrix of the interference, x$_I$ is the interference, n is a noise vector, H̃$_k^I$, is a channel matrix of the interference, W$_k^I$ is a precoding matrix of the interference, x$_k^I$, is the interference, n$_k$ is a noise vector, and k indicates an index of resource elements having a common source of interference.

14. The method of claim 12, wherein comparing the off-diagonal matrix elements is comprised of determining that the precoding matrix index is precoding matrix index 1 if off-diagonal elements 2 and 3 of a precoding matrix correlation W$_k$ W$_k^\dagger$ are both real value 1, the precoding matrix index is precoding matrix index 2 if the off-diagonal elements 2 and 3 of the precoding matrix correlation W$_k$W$_k^\dagger$ are both real value −1, the precoding matrix index is precoding matrix index 3 if the off-diagonal elements 2 and 3 of the precoding matrix correlation W$_k$W$_k^\dagger$ are imaginary values −j and j, respectively, and the precoding matrix index is precoding matrix index 4 if the off-diagonal elements 2 and 3 of the precoding matrix correlation W$_k$W$_k^\dagger$ are imaginary values j and −j, respectively.

15. The method of claim 14, wherein precoding matrix index 1, precoding matrix index 2, precoding matrix index 3, and precoding matrix index 4 are $$\frac{1}{2}\begin{bmatrix}1 & 1\\ 1 & 1\end{bmatrix}, \frac{1}{2}\begin{bmatrix}1 & -1\\ -1 & 1\end{bmatrix}, \frac{1}{2}\begin{bmatrix}1 & -j\\ j & 1\end{bmatrix}, \text{and } \frac{1}{2}\begin{bmatrix}1 & j\\ -j & 1\end{bmatrix},$$

respectively.

16. The method of claim 11, further comprising:
calculating, by a distance calculator for each modulation order, a distance of each modulation order of each candidate precoding matrix index; and
making a hard determination of the precoding matrix index or determining a probability of being the precoding matrix index for each modulation order of each candidate precoding matrix index.

17. The method of claim 16, wherein calculating, by the distance calculator for each modulation order, the distance of each modulation order of each candidate precoding matrix index is comprised of calculating a distance for each possible modulation order for each candidate precoding matrix index.

18. The method of claim 17, wherein calculating the distance for each possible modulation order for each candidate precoding matrix index is comprised of determining the precoding matrix index having a minimum distance as the precoding matrix index of the interference or determining a probability for each modulation order of each candidate precoding matrix index.

19. The method of claim 17, wherein the distance is a Euclidian distance.

20. The method of claim 17, wherein the modulation order is one of 4 quadrature amplitude modulation 4QAM, 16QAM, 64QAM, or 256QAM.

* * * * *